United States Patent Office 2,991,626
Patented July 11, 1961

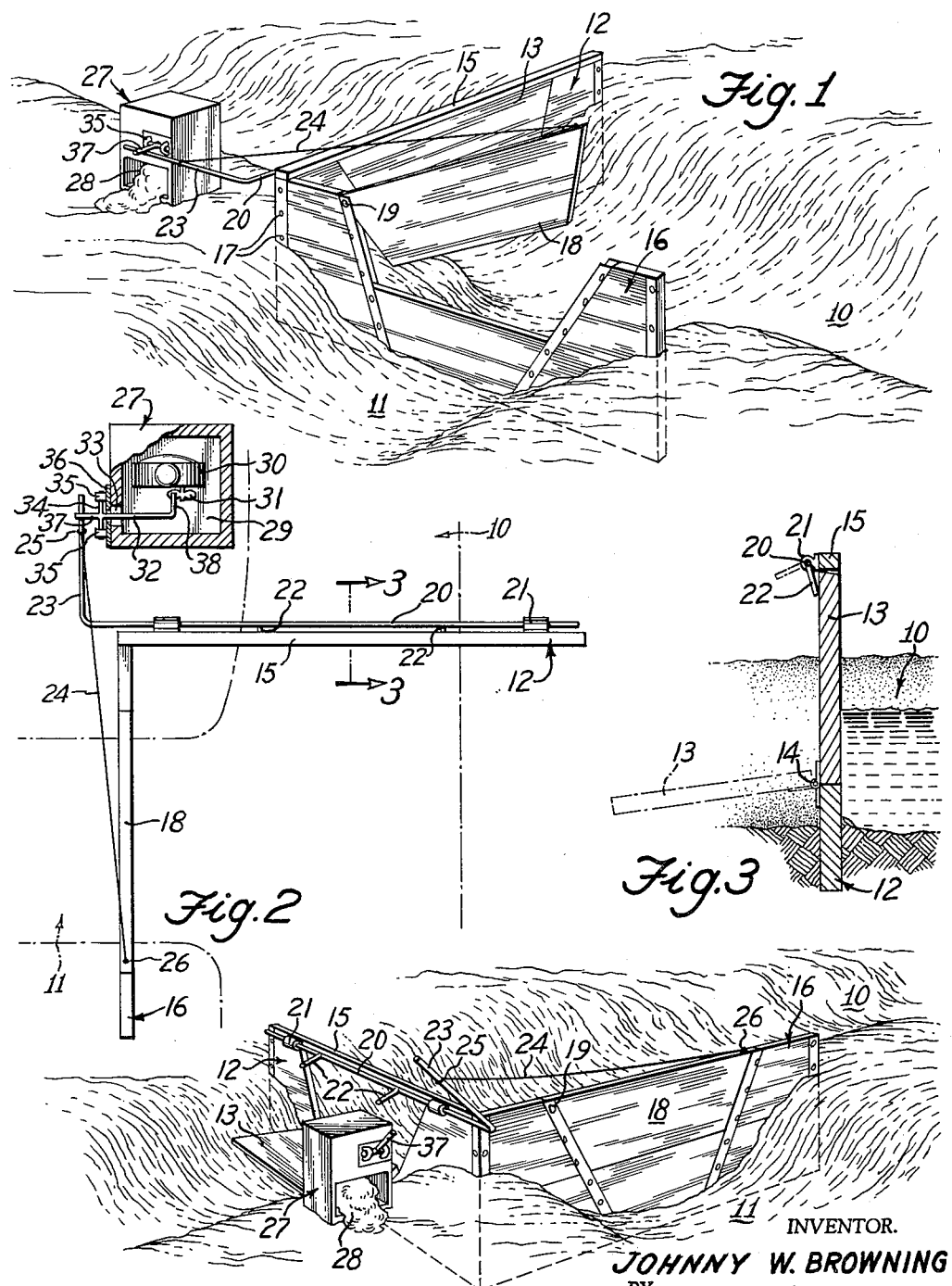

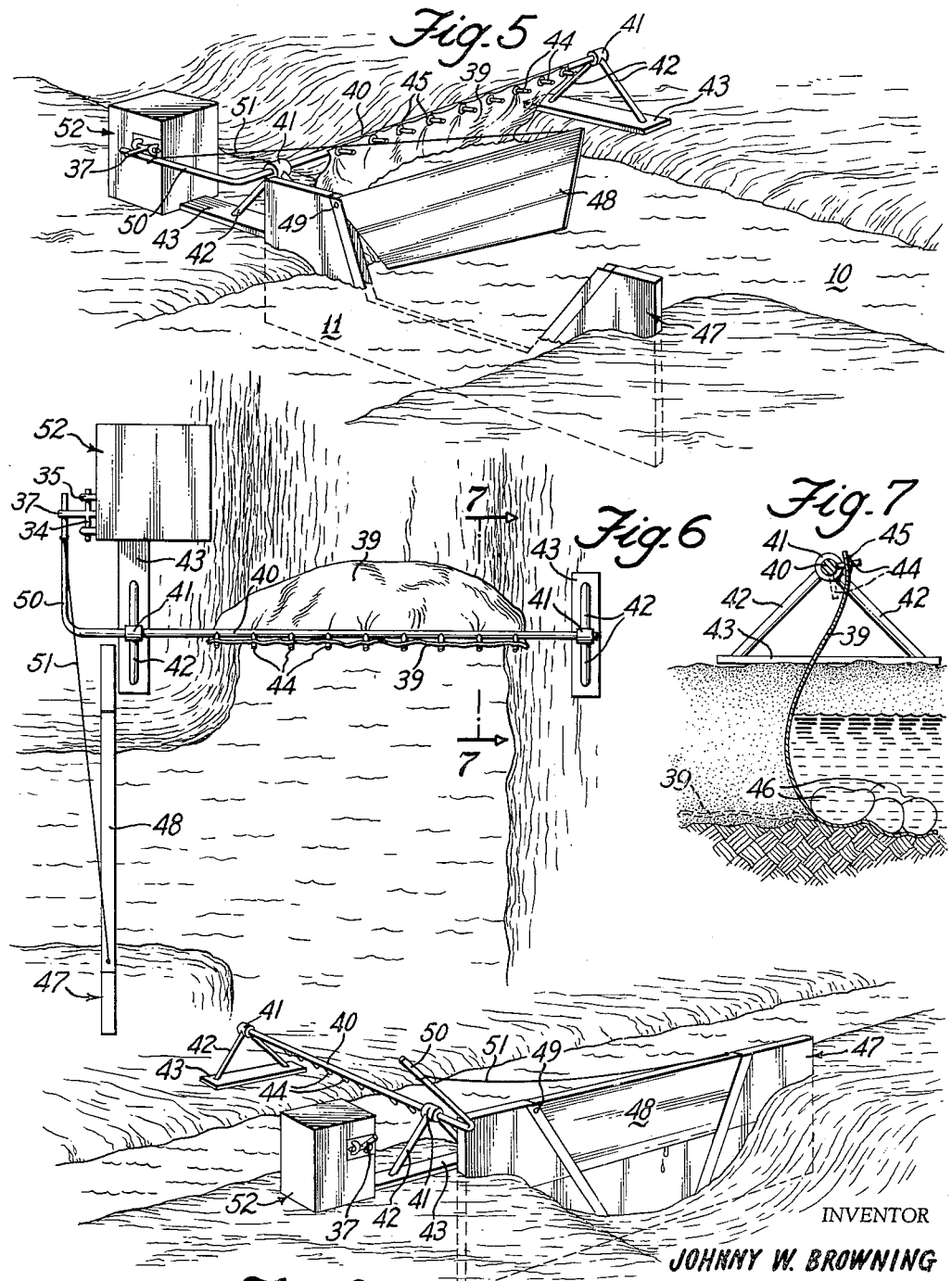

2,991,626
AUTOMATIC IRRIGATION DAM
Johnny W. Browning, R.F.D., Gannett, Idaho
Filed Oct. 16, 1958, Ser. No. 767,622
4 Claims. (Cl. 61—29)

The present invention relates to dams of that type utilized for controlling the flow of water through irrigation ditches.

This application is a continuation-in-part of my prior copending application Serial Number 714,567, filed Feb. 11, 1958, for Automtic Irrigation Dam, and now abandoned.

A primary object of the invention resides in the provision of a dam adapted to be located forwardly of a lateral discharge branch of an irrigation ditch so as to arrest the flow of water through the main irrigation ditch and thereby force the water through the lateral branch.

A further object is to provide a dam of the above mentioned character which further includes means for automatically opening the dam with respect to the main irrigation ditch and for simultaneously closing communication between the main irrigation ditch and the adjacent lateral branch at a desired time, and automatically, so that the full supply of water may pass through the main irrigation ditch beyond the dam to the desired lateral discharge branch on the down-stream side of the dam.

Still another object is to provide an irrigation dam of the above-mentioned character adapted to have its operation controlled by a simple timing device such as an ordinary alarm clock, the dam requiring no attendant to be present once the same is set for automatic operation, and the dam being extremely simplified and inexpensive in construction and embodying a minimum number of rugged and durable operating parts.

Other objects and advantages of the invention will become apparent during the course of the following detailed description.

With reference to the drawings forming a part of this application and wherein like numerals are employed to designate like parts throughout the same, FIGURE 1 is a perspective view of an irrigation dam embodying the invention and showing the main irrigation ditch closed or blocked and the lateral branch or ditch open.

FIGURE 2 is a plan view partly diagrammatic and partly in section of the dam.

FIGURE 3 is an enlarged vertical section taken on line 3—3 of FIGURE 2.

FIGURE 4 is a further perspective view of the dam illustrating the dam after automatic operation of the same for opening the main irrigation ditch and closing the lateral ditch.

FIGURE 5 is a perspective view of an irrigation dam including a flexible fabric dam in accordance with a modification of the invention.

FIGURE 6 is a plan view of the same.

FIGURE 7 is a vertical section taken on line 7—7 of FIGURE 6.

FIGURE 8 is a perspective view of the same in FIGURE 5 after automatic operation of the timing means for opening the main irrigation ditch and closing the lateral ditch.

In the drawings, wherein for the purpose of illustration are shown preferred embodiments of the invention, attention is directed first to FIGURES 1-4 inclusive, wherein the numeral 10 designates a main irrigation ditch having a lateral discharge branch 11. Just forwardly of the lateral branch 11, a main dam 12 is positioned across the main irrigation ditch 10 and suitably rigidly anchored therein so as to be capable of blocking the flow of water therethrough. The main dam 12 is disposed vertically, and may be formed of suitable lumber or the like. The main dam 12 includes a vertically swingable drop gate 13 hinged at its lower edge to the main dam, as indicated at 14 in FIGURE 3. The gate 13 is adapted to assume a vertical position as in FIGURE 1 for blocking the flow of water down-stream in the main irrigation ditch, and the gate may swing forwardly to a substantially horoizontal or open position as in FIGURE 4 to allow the passage of water beyond the main dam 12 in the main irrigation ditch 10 when desired. The main dam 12 further embodies a top rail 15 above the top of the gate 13, as shown.

A side or lateral dam 16 is provided, at right angles to the main dam 12, and extending rearwardly thereof at one end of the main dam and preferably rigidly secured thereto as at 17. The side dam 16 extends across the lateral ditch 11 and is suitably rigidly anchored therein to control the passage of water from the main ditch 10 into the lateral ditch 11. The side dam 16 has a drop gate 18 adapted to swing vertically in the plane of the side dam and hinged thereto at one upper corner of the gate 18 as shown at 19. When the gate 18 is elevated as in FIGURE 1, water in the main ditch 10 blocked by the main dam 12 may pass through the side dam 16 and into the lateral ditch 11. When the gate 18 is lowered as in FIGURE 4, the side dam 16 will block the passage of water from the main irrigation ditch into the lateral ditch 11.

Operating means for the two gates 13 and 18 are provided as follows. A horizontal rock shaft 20 extends adjacent to the forward side of the top rail 15 of the main dam and is journaled within and supported by a pair of bearings 21, rigidly secured to the top rail 15. The rock shaft 20 has a pair of depending extensions or fingers 22, rigid therewith and adapted to engage the forward side of the gate 13, near the top of such gate to hold the gate in the vertical or closed position as indicated in FIGURE 3. The rock shaft 20 is provided at one end with a right angle extension or arm 23, preferably formed integral therewith and extending somewhat forwardly of the main dam 12 and near and outwardly of the side dam as shown in FIGURE 2. A cord or cable 24 has one end secured at 25 to the arm 23 of rock shaft 20, and the other end of the cord or cable is secured at 26 to the upper corner of the side gate 18, which corner is remote from the hinge 19 of such gate.

A control box 27 is mounted upon the bank of the main irrigation ditch, forwardly of the main dam 12, and this control box includes a bottom compartment 28 adapted to receive a shovel of dirt, or the like, for anchoring the control box. The control box 27 also has an elevated shelf 29, upon which is rigidly mounted an alarm clock 30 having an alarm winding key 31 which rotates when the alarm of the clock goes off. A trip rod or trigger 32 is provided at right angles to the arm 23, and this rod extends through an opening 33 in one side wall of the box 27 and carries a transverse pivot element 34, outwardly of the side wall of the control box as shown in FIGURE 2. The pivot element 34 has its end journaled within bearings 35, which are in turn rigidly mounted upon plate 36, rigidly secured to the adjacent side wall of the box 27 and having a slot to receive the rod 32 as indicated in FIGURE 2. The outer extremity 37 of the trigger 32 is adapted to cross and overlie the forward extremity of the arm 23 as shown in FIGURES 1 and 2, at which time the arm 23 and trigger 32 are disposed substantially horizontally and the fingers 22 of the rock shaft 20 are arranged generally vertically beneath the rock shaft for holding the gate 13 closed against the water pressure behind the main dam, FIGURE 3. The trigger 32 is provided at its inner end with a short transverse extension 38, integral therewith, and adapted to rest upon the alarm clock key 31, which serves to hold the trigger 32 in the horizontal position shown in FIGURE 2 and preventing the downward movement of extension 38 under the influence of the upward force exerted by the arm 23, due to the water pressure upon the gate 13. With the parts thus arranged, the cable 24 is under tension and holds the side gate 18 elevated as in FIGURE 1.

In the operation of the dam, the farmer or attendant adjusts the operating parts to the positions shown in FIGURES 1 and 2. The main gate 13 is closed and the side gate 18 is opened. The water pressure on the main gate 13 reacts against the extensions 22 and tends to turn the rock shaft 20 in a direction causing the elevation of the arm 23. This arm, however, is firmly held down by the trigger 32 which has its extension 38 resting upon the now stationary alarm clock key 31.

The alarm clock may be set to go off after any desired period of time, such as several hours, and during this period, prior to the alarm, the water flowing in the main irrigation ditch 10 is blocked by the main dam 12 and diverted into the lateral ditch 11 for the desired irrigation purpose. When the desired period of time has elapsed, the alarm clock goes off or sounds its alarm and the key 31 turns in the usual manner and releases the extension 38 of trigger 32 so that the trigger may turn upon its pivot 34 to release the arm 23. The upward pressure of the arm 23 upon the outer extremity 37 of the trigger causes such extremity to be elevated instantly to a position such as illustrated in FIGURE 4, and when this occurs, the arm 23 swings upwardly as shown in FIGURE 4 and the side gate 18 is lowered to closed position. Simultaneously, the fingers 22 of the rock shaft 20 are turned to the broken line position shown in FIGURE 3, and this releases the main gate 13 which now drops downwardly and forwardly to the broken line position of FIGURE 3 due to the pressure of the water upon it. The passage of the water from the main ditch 10 into the lateral ditch 11 is now blocked by the gate 18, and the water is free to flow down-stream in the main ditch 10 toward the next lateral ditch, which may have another irrigation dam adjacent thereto.

It is thus seen that I have provided a highly simplified irrigation dam which after being set requires no attendant to be present, and the dam is automatic in operation for allowing the water in the main irrigation ditch to resume its flow down-stream, after the water has been diverted through the lateral ditch for any desired length of time. All that is required to repeat the automatic operation of the dam any desired number of times is the resetting of the operating parts to their positions shown in FIGURE 1 and the rewinding and resetting of the alarm clock 30.

In FIGURES 5–8 of the drawings, there is shown a modification of the invention, wherein the main irrigation ditch 10 and lateral branch ditch 11 are again illustrated. The main dam for the irrigation ditch 10, FIGURES 5–8, comprises a flexible sheet 39 or drop gate means formed of canvas, or the like, and of a width sufficient to extend across the main ditch 10 from bank-to-bank thereof.

A rock shaft 40 similar to the rock shaft 20 in the prior form of the invention extends transversely across the main ditch 10 at an elevation above the same, and the opposite ends of this rock shaft are supported by and journalled for rotation within bearings 41, rigidly secured to the tops of upwardly converging support legs 42, in turn rigidly mounted upon suitable base plates 43 which rest upon the opposite banks of the ditch 10.

The rock shaft 40 carries a plurality of spaced radial pins or fingers 44, rigid therewith, and detachably engageable through eyelets 45 provided in the canvas dam 39 near its upper transverse margin. The bottom of the canvas dam 39 may be anchored to the bottom of the main ditch 10 in any suitable manner, as by piling rocks 46 upon the same or by staking the dam to the bottom, or the like.

In FIGURES 5–8, a side or lateral dam 47 for the lateral ditch 11 is provided, and this side dam may be identical to the side dam 16 previously described. The side dam 47 has a vertically swingable drop gate 48 pivoted thereto at 49, as shown.

The rock shaft 40 is provided at its end nearest the side dam with a right angle extension 50, similar to the extension 23 of the rock shaft 20. A cord or cable 51 interconnects the gate 48 with the extension 50 in the same manner that the cable 24 interconnects the gate 18 and extension 23.

A control box 52 substantially identical to the control box 27 is mounted upon the bank of the irrigation ditch, as shown, and this control box may be weighted to prevent its moving or it may be anchored to the ground in any desired manner. If desired, the control box 52 may be rigidly secured to the base plate 43 of the adjacent support for rock shaft 40.

The control box 52 contains the identical control elements previously described in connection with the box 27, and shown particularly in FIGURE 2, and including the identical trigger 32 having the extension 37. Any further description of the control box 52 is therefore unnecessary in connection with FIGURES 5–8.

The operation of the dam shown in FIGURES 5–8 is essentially the same as for the dam of FIGURES 1–4. When the controls are set as indicated in FIGURE 5, the trigger extension 37 holds the rock shaft extension 50 in the approximate horizontal position shown, and the pins 44 now extend generally horizontally and slightly upwardly beyond the opposite side of the rock shaft 40 as shown in FIGURES 5 and 7. The eyelets 45 of the canvas dam are engaged over the pins 44 and the gate 48 is held open by the cable 51, as shown. In this condition of the elements, the water in the main ditch 10 is blocked by the canvas dam 39 and diverted to the lateral ditch 11.

When the prescribed time has elapsed for the passage of water through the branch or lateral ditch 11, the clock key 31 will release the trigger extension 38 as previously described in the first form of the invention, and the trigger extension 37 will swing upwardly and release the extension 50 of rock shaft 40, allowing the rock shaft to turn clockwise in FIGURE 7 under the influence of water pressure on the canvas dam and under the weight of the gate 48. When this occurs, the gate 48 will drop to the closed position of FIGURE 8, and the pins 44 of the rock shaft will assume generally vertical depending positions such as shown in broken lines in FIGURE 7. The eyelets 45 will slide off of the pins 44, and the canvas dam 39 will drop so that the main irrigation ditch 10 is now open for the full flow of water down-stream. The branch ditch 11 is now closed to the flow of water by the gate 48.

In order to reset the irrigation dam of FIGURES 5 through 8 for repeated automatic operation, it is merely necessary to rewind the alarm clock 30 and to return the parts to their positions shown in FIGURE 5, whereupon the main ditch 10 is again dammed and the lateral ditch 11 is again open.

It is to be understood that the forms of the invention herewith shown and described are to be taken as preferred examples of the same, and that various changes in the shape, size and arrangement of parts may be resorted to, without departing from the spirit of the invention or the scope of the subjoined claims.

Having thus described the invention, I claim:

1. Irrigation apparatus for controlling the flow of water in a main irrigation ditch having a lateral branch ditch extending beyond one side of the main ditch, said apparatus comprising a substantially L-shaped dam including a first section extending across the main ditch and a second section extending across the branch ditch, a drop gate for said first section of the dam to block the flow of water in the main ditch when elevated and allowing the water to flow through the main ditch when lowered, a drop gate for the second section of said dam adapted to block the flow of water through the branch ditch when lowered and allowing water to flow through the branch ditch when elevated, a substantially horizontal rock shaft on said first section of the dam transversely of the main ditch and having a plurality of spaced pins extending transversely beyond one side thereof to turn therewith and engageable with the upper portion of the drop gate of said first dam section to maintain such drop gate elevated when the rock shaft is held in one operative position, a transverse crank arm carried by one end of the rock shaft to swing in a vertical plane upon rotation of the rock shaft and disposed near one side of the drop gate of the second dam section and spaced from such drop gate longitudinally of the main ditch, a flexible element interconnecting said crank arm and the drop gate of the second dam section and serving to maintain the drop gate of the second dam section elevated when said crank arm and pins are positioned to maintain the drop gate of the first dam section elevated, a timer mechanism fixedly mounted adjacent one side of said crank arm and including a trigger element engageable with the crank arm to hold the same in a postion whereby said drop gates are both elevated, said timer operable to cause the trigger to disengage said crank arm so that the latter may swing vertically clockwise with said pins to allow the lowering of the drop gate of the second dam section and substantially simultaneous lowering of the drop gate of the first dam section due to water pressure against the same.

2. Irrigation apparatus for controlling the flow of water in a main irrigation ditch having a lateral branch ditch extending from one side thereof, said apparatus comprising an L-shaped dam including a first section extending transversely of the main ditch and a second section extending transverely of the branch ditch, drop gate means for the first dam section to block the flow of water in the main ditch when elevated and allowing the passage of water through the main ditch when lowered, a drop gate for the second dam section adapted to block the flow of water through the branch ditch when lowered and allowing water to flow into the branch ditch when elevated, means hingedly connecting the end of said drop gate nearest the first dam section to the second dam section adjacent the top of said drop gate so that the drop gate is vertically swingable between elevated and lowered positions, a substantially horizontal rock shaft on the first dam section transversely of the main ditch and having a plurality of transverse fingers engageable with the upper portion of said drop gate means to maintain such means elevated when the rock shaft is in one operative position, a transverse crank arm carried by one end of said rock shaft to swing in a vertical plane upon rotation of the rock shaft and arranged near the second dam section and being substantially horizontal when said fingers are positioned to maintain said drop gate means elevated, a flexible element interconnecting said crank arm and the end of the drop gate remote from the first dam section and serving to maintain the drop gate elevated when said crank arm is disposed horizontally, a timer mechanism fixedly mounted near the crank arm and having a pivoted trigger element engageable above the crank arm transversely thereof to resist upward movement of the crank arm, whereby the drop gate means and said drop gate are both maintained elevated, said timer being operable to trip said trigger element and cause the latter to disengage the crank arm, whereby the crank arm swings upwardly clockwise with said fingers and allows lowering of the drop gate and simultaneous lowering of said drop gate means due to water pressure against the same.

3. Irrigation apparatus according to claim 2, wherein the drop gate means of the first dam section is a rigid gate hingedly secured at its lower edge to the first dam section and adapted to swing vertically between elevated and lowered positions.

4. Irrigation apparatus according to claim 2, wherein said drop gate means of the first dam section is a flexible sheet having its lower end anchored at the bottom of the main ditch and provided near its upper edge with a plurality of spaced openings to receive said plurality of fingers on the rock shaft.

References Cited in the file of this patent

UNITED STATES PATENTS

| | | |
|---|---|---|
| 1,080,944 | Baker | Dec. 9, 1913 |
| 1,237,107 | Shaffer | Aug. 14, 1917 |
| 2,584,364 | Osborn | Feb. 5, 1952 |
| 2,680,351 | Jaramillo | June 8, 1954 |